US007686286B2

(12) United States Patent
Colby

(10) Patent No.: US 7,686,286 B2
(45) Date of Patent: Mar. 30, 2010

(54) VARIABLE THICKNESS PIN CLAMP

(75) Inventor: Douglas D. Colby, Clarkston, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 30 days.

(21) Appl. No.: 11/506,655

(22) Filed: Aug. 17, 2006

(65) Prior Publication Data

US 2007/0045362 A1 Mar. 1, 2007

Related U.S. Application Data

(60) Provisional application No. 60/711,571, filed on Aug. 26, 2005.

(51) Int. Cl.
*B23Q 3/02* (2006.01)

(52) U.S. Cl. ............................. 269/32; 269/24; 269/27

(58) Field of Classification Search .................. 269/32, 269/24, 27, 20, 228, 254 CS
See application file for complete search history.

(56) References Cited

U.S. PATENT DOCUMENTS 4,618,131 A 10/1986 Campisi et al.
6,364,300 B1 4/2002 Kita
6,378,855 B1 4/2002 Sawdon et al.
6,439,560 B2 * 8/2002 Sawada et al. ................ 269/32
6,736,384 B2 * 5/2004 Yokota ........................ 269/32
6,976,671 B2 * 12/2005 Migliori ...................... 269/32
2002/0093131 A1 7/2002 Dugas et al.
2005/0017424 A1 * 1/2005 Migliori ...................... 269/32
2007/0045362 A1 * 3/2007 Colby ........................ 224/101

FOREIGN PATENT DOCUMENTS

DE 29713607 U 9/1997
EP 1391266 2/2004

* cited by examiner

*Primary Examiner*—Lee D Wilson
(74) *Attorney, Agent, or Firm*—Harness, Dickey & Pierce, P.L.C.

(57) ABSTRACT

A pin clamp for use in a manufacturing line. The clamp including a body and a pin arranged on one end thereof. The clamp having a hook arranged within the pin. A first torque arm is connected to the hook and contacts a spring. A second torque arm contacts the spring and a link member. The clamp is capable of holding workpieces at various load strengths and workpieces having a variety of thicknesses.

15 Claims, 3 Drawing Sheets

VARIABLE THICKNESS PIN CLAMP

Continuation of U.S. Provisional Patent Application Ser. No. 60/711,571—Filed: Aug. 26, 2005

BACKGROUND OF THE INVENTION

Hook pin assemblies have been known for numerous years in robotic and manufacturing applications. A hook pin assembly may in one type of application be used with a robot end effector to hook a work piece or material to a specified work station such that an operation can be performed on the work piece. A specific prior art example hook pin assembly can be found in the automobile industry, there the hook pin assemblies are used to secure an automobile body to a frame assembly, wherein the frame assembly is connected to and moves the automobile body down a manufacturing line. The assemblies are used in conjunction with a hook mechanism which enters the hook pin assembly and clamps against a stop surface. Generally, the hook is placed with a force thereupon to ensure the hook is not disengaged from the pin during operation of the work piece in the work environment.

Prior art hook pin assemblies include a single unitary hook pin unit. These prior art hook pin units generally have a rectangular portion that includes an appendage extending from one side of the rectangular portion. The prior art hook pin units also include a channel through the appendage of the hook pin unit along an axis of the appendage. The channel extends completely through both outer surfaces of the appendage and creates a locking surface to which a hook will engage during work piece operations. The rectangular portions of a prior art hook pin unit includes a plurality of holes such that it can be connected to an end effector of a robot or to a work piece unit depending on the configuration of the work environment.

However, there have been problems in the prior art with hook pin units such as if a pin fails the entire line has to be stopped to replace the hook pin unit. This reduces productivity and increases the cost of manufacturing the work piece article. Furthermore, the one piece pin units are more complicated to make and often tend to be very heavy. Also the prior art hook pin units are not robust and had to be replaced frequently. Many of the prior art hook pin units are designed to hold at one holding point with one force and cannot vary their holding force unless a complete new prior art hook unit is designed. Furthermore, many of the prior art hook pin units were very susceptible to weld slag contamination thus reducing the reliability and life cycle of such hook pin units.

Therefore, there is a need in the art for an improved hook pin assembly that reduce costs, is stronger, more robust, is immune to weld slag, has a longer life cycle, is capable at operating at variable thicknesses, is capable of having a high holding force over a more varied range and is easier to maintain and repair in the work place environment.

SUMMARY OF THE INVENTION

According to the present invention, the foregoing and other objects and advantages are obtained by a novel design for an improved variable thickness hook pin unit having weld slag protection for use in an automotive environment or other manufacturing environment. The hook pin unit includes a pin in contact with a base member and a hook member arranged within the bore of the pin. The hook member moves between an unhooked position and a hooked position with respect to the pin and base member such that the pin is always protected from contamination from weld slag and other contaminates in the manufacturing environment. A first torque arm is connected to an end of the hook member while a second torque arm is connected to a link within the body of the clamp. The link is connected to a second link arm which is connected to a rod of a cylinder to allow for movement of the linkage between a hooked and unhooked position. A spring member is arranged between the first and second torque arm on an end of the first and second torque arm. The torque arms will be capable of relative movement between each other which will also allow for relative movement between the hook member and the links of the clamp.

Other objects, features and advantages of the present invention will become apparent from the subsequent description taken in conjunction with the accompanying drawings.

DESCRIPTION OF THE PREFERRED EMBODIMENT(S) AND BEST MODE FOR CARRYING OUT THE INVENTION

Figure 1:
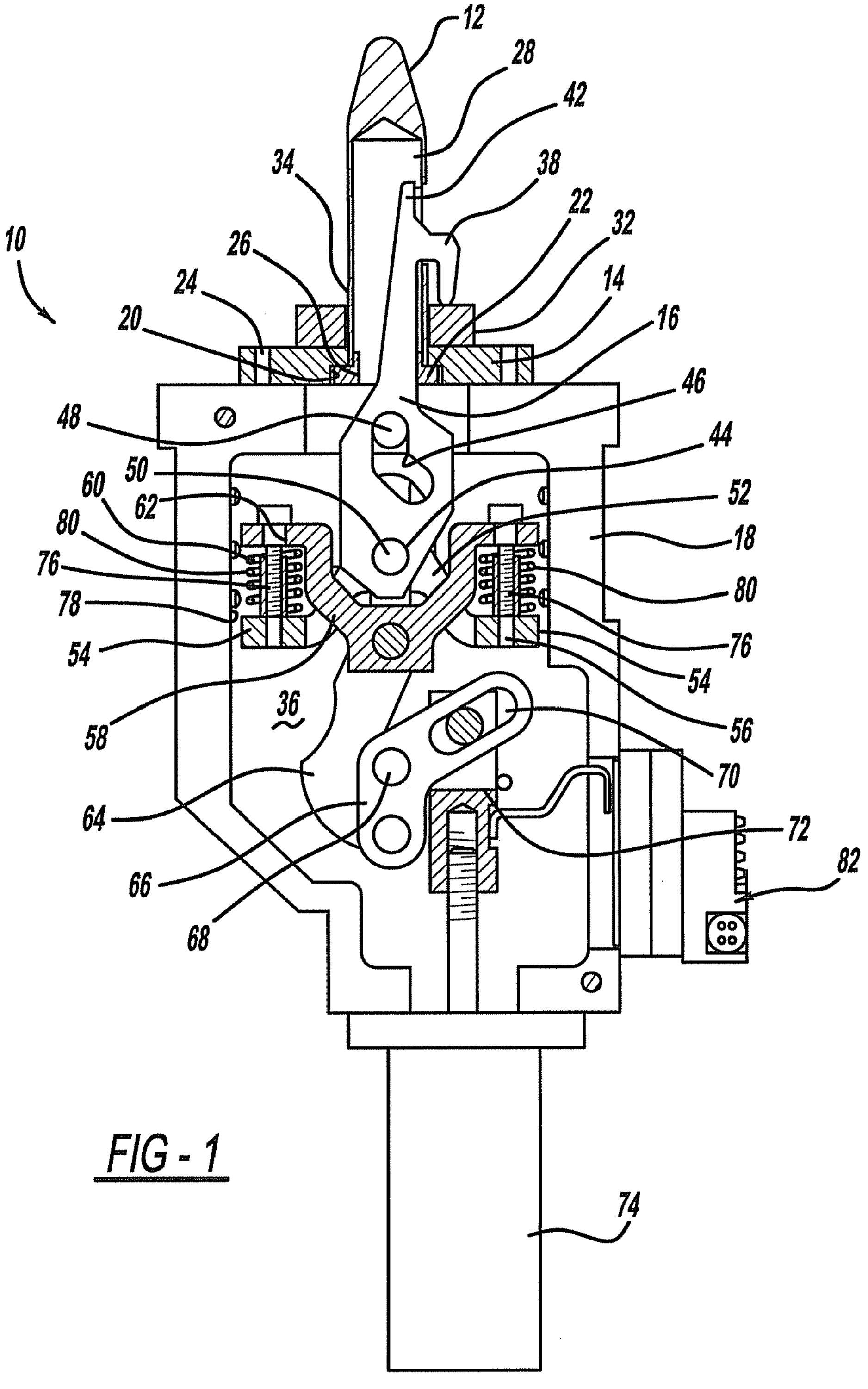
FIG. 1 shows a cross section of a variable thickness pin clamp according to the present invention.
Figure 2:
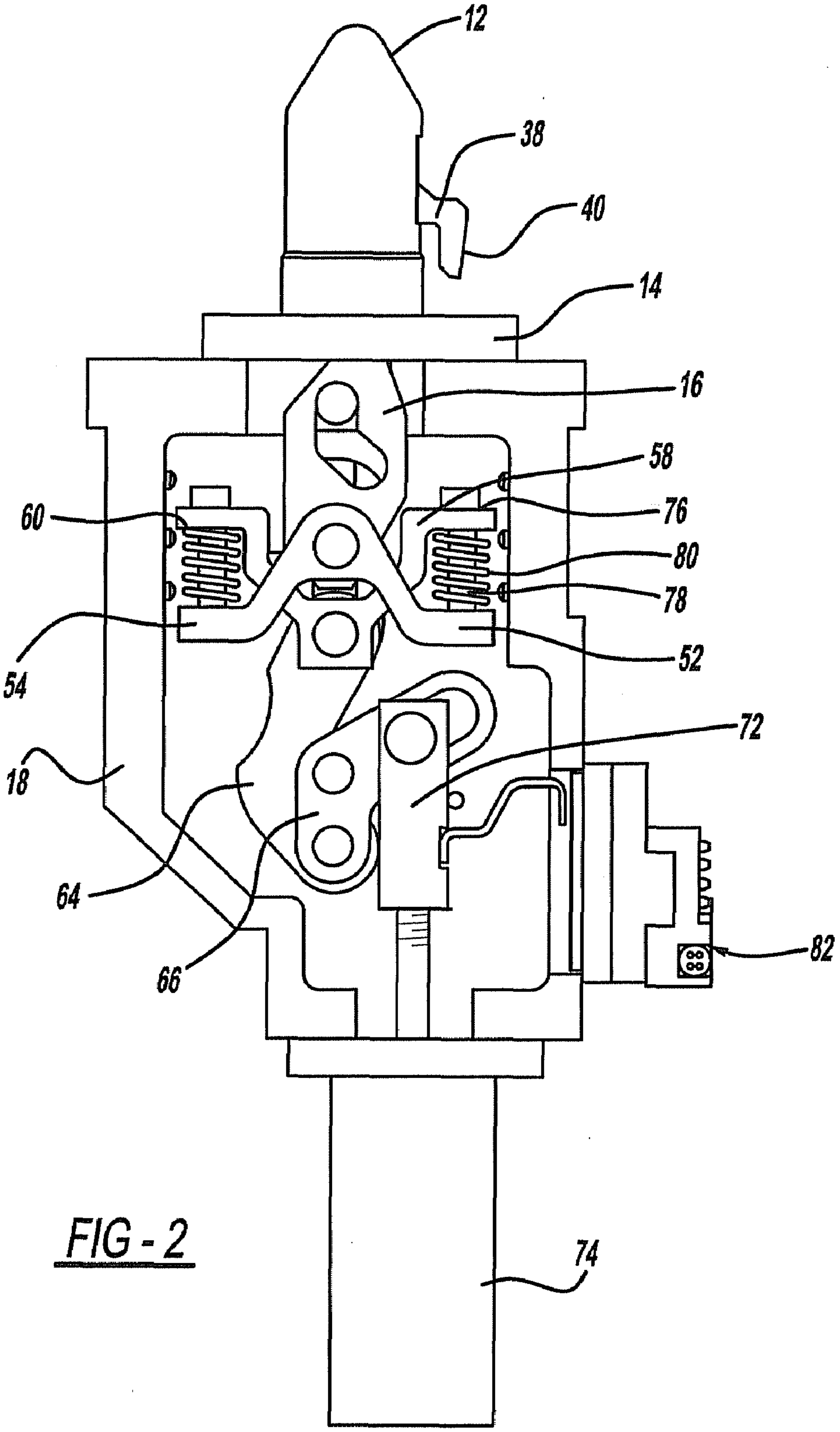
FIG. 2 shows a partial tear away view of a variable thickness pin clamp according to the present invention.
Figure 3:
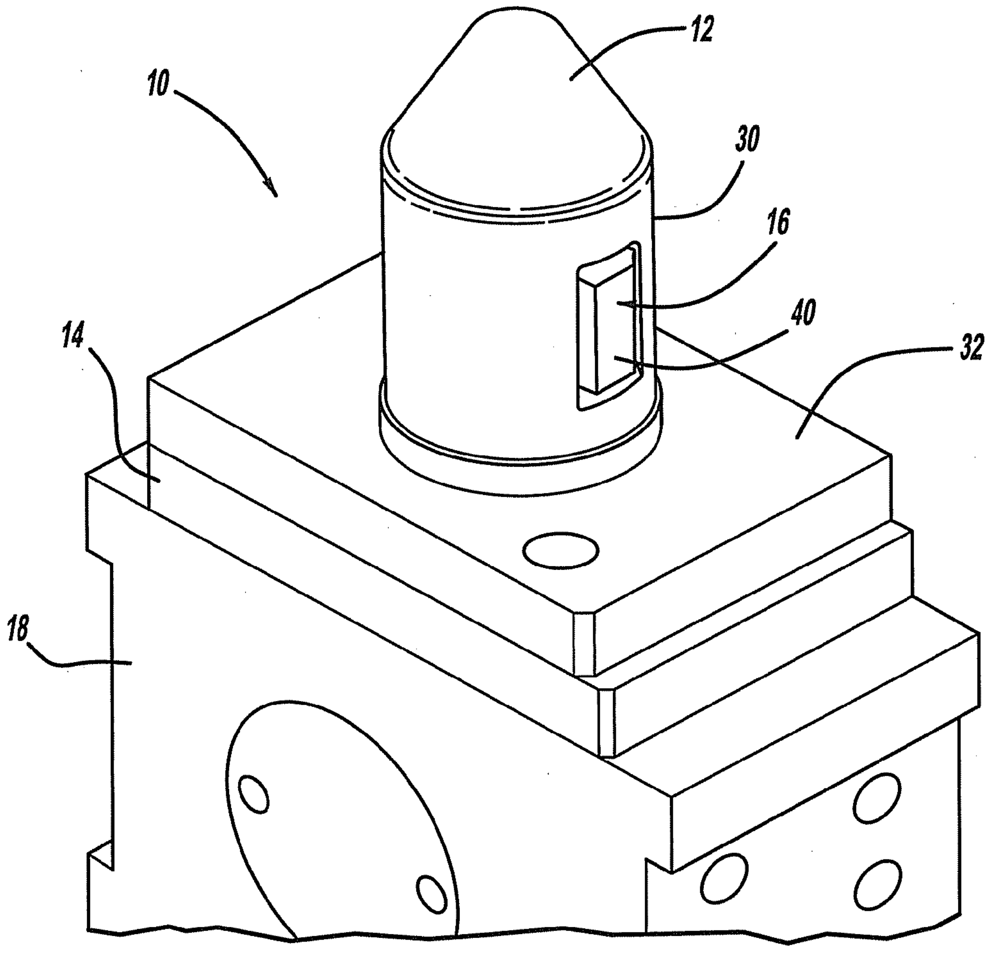
FIG. 3 shows a perspective view of the variable thickness pin clamp in its opened or unhooked position.

Referring to the drawings, FIGS. 1 through 3 show one contemplated embodiment of a variable thickness pin clamp 10 according to the present invention. The variable thickness pin clamp 10 includes a pin 12 arranged within an orifice of a pin base 14 of the variable thickness pin clamp 10. The variable thickness pin clamp 10 further includes a hook 16 that is moveable between an unhooked or unclamped position and a hooked or clamped position. FIGS. 1 and 2 show the variable thickness pin clamp 10 in a hooked or clamped position. FIG. 3 shows the clamp 10 in the unhooked or unclamped position. The variable thickness pin clamp 10 of the present invention is generally impervious to and offers protection from weld slag and other contaminates which are found in the manufacturing environment for which the clamp 10 will be used. The hook 16 will provide a barrier between the weld slag and other contaminates from entering the clamp 10 in the unclamped or unhooked position and hooked or clamped position.

FIG. 1 shows a variable thickness pin clamp 10 in its hooked or clamped position. It should be noted that the clamp 10 shown is just one possible embodiment and that the variable thickness pin clamp 10 may be used in many other contemplated embodiments and combinations with components such as, but not limited to, power clamps, electric clamps, manual clamps, hydraulic clamps and the like all which use a hook and pin arrangement in conjunction with the variable thickness features offered by the present invention. A hook pin unit includes a hook pin base 14 that is connected to an end of the clamp body 18 for use in the work environment or on a work piece that is used in the manufacturing environment. Generally, the hook pin base 14 can have any shape such as, but not limited to, a rectangle, square, circle, oval, etc. The hook pin base 14 includes a generally circular orifice 20 through a center point thereof. The base 14 also includes a circular circumferential shoulder or stop 22 located at a predetermined distance within the circular orifice 20 of the base 14. A plurality of cavities and/or orifices 24 are arranged through or placed into a surface of the base 14. The plurality of orifices 24 may be through the entire width of the base 14 if needed or used in the form of cavities which extend a predetermined distance into a width of the base 14. The cavities or orifices 24 may be placed on both sides of the base 14. The cavities and/or orifices 24 are used to connect the base 14 to a surface of the body 18 of the clamp 10 or the like. The circumferential shoulder 22 within the circular orifice 20 of the base 14 acts as a stop such that the pin 12 is inserted within the orifice 20 and stops against the circumferential shoulder 22 and is held in place therewith. The circular orifice 20 also includes a flat edge on one or both sides thereof which will allow for the pin 12 to be inserted into the base 14 in a specific manner or direction. This will allow for proper alignment of the hook 16 and pin 12 with relation to the work piece or component being clamped or hooked. The two flat surfaces or edges on opposite sides of the circular orifice 20 will act as a key to lock the pin 12 within the base 14 at a predetermined position. It should be noted that the base 14 generally is made of a steel material, however any other metal, hard plastic, ceramic, composite or the like may be used to form the base 14 for the hook pin unit.

The hook pin unit also includes a pin 12 that is arranged within the orifice 20 of the base 14. The pin 12 generally has a conical shape. It should be noted that the pin shape may also be round, rectangle, square, diamond, oval, or any other known shape, etc. The pin 12 has a circular shaped flange 26 on one end thereof. The opposite end has a cone shaped tip. The pin 12 also has a generally cylindrically shaped inner bore or cavity 28 that extends longitudinally along the axis of the pin 12 a predetermined distance. The cavity 28 generally has a cone shaped end to allow for movement of the hook 16 within the inner bore or cavity 28 of the pin 12. The pin 12 also includes a generally rectangular shaped orifice 30 through one side surface. The rectangular shaped orifice 30 may be any other shape depending on the design and manufacturing requirements for the hook 16. The rectangular orifice 30 is presized and located at a position that will allow for the hook 16 to move a predetermined distance until it engages with a part or machine that is being clamped. The pin 12 also includes a first and second cutout arranged at an end of the body portion of the pin 12. The cutout also removes a portion of the circumferential flange 26 located at one end of the pin. The first and second cutout areas are arranged across from each other and at 90° from the flat surfaces of the circumferential flange 26 of the pin 12. The circumferential flange 26 includes a first and second flat surface that will align with and mate with the first and second flat surfaces of the base 14 to allow for the pin 12 to be installed in the base 14 in a predetermined position. Other methods to align the pin 12 to the base 14 are also contemplated. The cutouts in the pin 12 will allow for movement of the hook 16 between the unhooked and hooked positions. It should be noted that the pin 12 is generally made of a steel material, however any other metal, ceramic, hard plastic, composite or the like may also be used for the pin.

FIGS. 1 and 2 show the pin 12 arranged within the base 14 that is secured and contacting the clamp body 18 on one side thereof and having a spacer 32 arranged and contacting an opposite side surface of the base 14. The spacer 32 also includes a circular orifice 34 through a center point thereof. The spacer 32 is arranged over the pin 12 and in contact with the base 14 on a top surface thereof. The spacer 32 will allow for a predetermined distance to exist between the hook 16 in its clamped or hooked position and the surface of the spacer 32. In the embodiment shown the hook 16 engages the spacer 32, however in other contemplated embodiments the hook 16 will have a predetermined distance or gap between the end of the hook 16 and the spacer 32. This will allow for precise hook and clamping efforts for the work piece being operated on in the manufacturing environment. It should be noted that it is contemplated to use the variable thickness pin clamp 10 without a spacer 32.

The hook pin unit also includes a hook 16. The hook 16 is arranged within the inner bore 28 of the pin 12 and extends into an inner bore 36 of the body 18 of the clamp 10. It should be noted that the hook 16 is made of a steel material in one embodiment, however any other metal, ceramic, composite, hard plastic or the like may also be used for the hook 16. The hook 16 includes a hook arm 38 extending from or near one end thereof. The hook arm 38 generally has an L-shape that extends from a surface of the hook body. The hook arm 38 extends from the hook body at a predetermined position on the hook body. The hook arm 38 includes a flat outer surface 40 that will act as a protective barrier for the hook 16 and pin 12 when the clamp 10 is in its unhooked position. The flat surface 40 of the hook arm 38 will align with the outer surface of the pin 12 and create a protective barrier or shield that is flat and aligned with the outer surface of the pin 12. This will ensure that no weld slag or other contaminates are capable of entering and contaminating the interior of the clamp 10 when the clamp is not in operation. The hook arm 38 includes an angled surface at a top end thereof and at a bottom end thereof to allow for easier insertion into the rectangular orifice 30 of the pin 12. It is also contemplated to put a sealing mechanism between the surface of the hook arm 38 and the rectangular orifice 30 of the pin 12. Such a seal is not shown in the embodiments of FIGS. 1 through 3. The hook 16 includes an extension 42 that extends a predetermined distance above the transition between the hook arm 38 and the hook 16 of the present invention. The extension 42 of the hook body has a flat surface that is parallel to a surface of the pin 12 when the clamp 10 is hooked or clamped. As shown in FIGS. 1 and 2 the flat surface of the extension 42 above the hook arm 38 will serve as a second shield or barrier to weld slag or other contaminates in the manufacturing environment. This second shield or barrier will protect the clamp 10 from internal contamination in the manufacturing environment during clamped procedures. As shown in FIGS. 1 and 2 the second shield or barrier surface aligns with the rectangular orifice 30 on an inside surface of the pin 12. However, it is contemplated to have the surface align with an outside surface of the pin 12 or at any other known position. This will ensure that no contaminates enter the clamp 10 when the clamp 10 is in its hooked or clamped position. A surface of the hook arm 16 will align with and provide protection for the bottom portion of the rectangular orifice as shown in FIGS. 1 and 2.

The hook 16 also includes a generally circular orifice 44 at one end thereof and a generally L-shaped orifice or track 46 located near a center portion of the hook 16. It should be noted that the orifices may be of any predetermined shapes, and that the L-shaped orifice may be of any predetermined length and include any predetermined angle therein to allow for proper positioning of the hook arm 38 with respect to the component being hooked in both the hooked and unhooked positions. As shown in FIGS. 1 and 2 a pin, fastener or the like 48 is arranged within the L-shaped orifice 46 of the hook 16 and a pin or the like 50 is arranged in the circular orifice 44 of the hook 16 and allows for the hook 16 to move with respect to internal mechanisms of the clamp 10. The internal linkages of the clamp 10 will rotate the hook 16 from its unclamped or unhooked position to its hooked position. The internal linkages of the clamp 10 will urge the hook 16 to travel in a downward position with relation to the fastener 48 arranged within the L-shaped orifice 46 until the pin 48 is in contact with or near the top portion of the L-shaped orifice 46. The fastener 48 following the L-shaped orifice or track 46 will secure the hook arm 38 into its hooked or clamped position. Therefore, it should be noted that it is contemplated to change the shape and length of the orifice 46 to any known shape or length in order to allow for a variety of hooked or clamped variations in the manufacturing environment.

A first torque arm 52 is connected to the orifice 44 via fastener 50 on one end of the hook 16. The first torque arm 52 generally has a U-shaped cross section with a flange 54 extending from each end thereof. An orifice 56 is arranged through each of the flanges 54. A second torque arm 58 generally having a Y-shaped cross section with a flange 60 extending from each end thereof is connected to a first link 64. Each of the flanges 60 of the second torque arm 58 have an orifice 62 therethrough. The second torque arm 58 is connected to one end of the first link arm 62 of the clamp 10. The first link arm 64 is then connected to a second link arm 66 on an opposite end thereof. The second link arm 66 has a fastener, dowel, etc., therethrough that will allow for rotation of the second link arm 66 with relation to the clamp body 18. The second link arm 66 has a track or channel 70 on one end thereof which is connected to a rod 72 that is connected to a cylinder 74 located on an end of the clamp body 18. The rod 72 will allow for rotation of the second link arm 66 with respect to the clamp body 18. A fastener or other device 76 is arranged between the first 52 and second torque arm 58. The fasteners 76 are passed through the orifice 62 of the second link arm 58 and secured within the orifice 56 of the first link arm 52. A sleeve 78 is arranged around the fastener or device 76. A spring 80 is arranged around the sleeve 78 and fastener 76 and between the first and second torque arms 52, 58. The first and second torque arms 52, 58 will be capable of relative movement between each other. It is also contemplated that the first and second torque arms 52, 58 may nestle within one another to provide structural strength between the torque arms 52, 58. It should be noted that the springs 80 will be capable of providing any necessary force or resistance needed for the variable thickness pin clamp 10. In one embodiment a 200 to 350 pound force will be capable for the clamp 10 in a toggle position via the springs 80. It should be noted that die springs 80 are preferred to be used but any other type of spring may be used and will allow for a controllable force to be used that will create a high holding force for the clamp 10. The high holding force will be created via a toggle mechanism in the clamp 10. It should be noted that all of the torque arms 52, 58 and links 64, 66 are generally made of a steel material however, any other metal, hard plastic, ceramic, composite or the like material may be used for the present invention. All these materials are arranged within the inner bore 36 of the clamp body 18. The clamp 10 also includes an electronic sensor 82 connected to a side surface of the body 18 to indicate when the clamp 10 is in its hooked or unhooked position. The electronic device will identify either by lights or an audible sound what position the clamp 10 is in.

In operation, the clamp 10 will move between a hooked and unhooked position while providing a barrier which will protect the clamp 10 from weld slag or other contaminates found in the manufacturing environment. The barrier is formed by either a flat surface 40 on an end of the hook arm 38 or by an extension surface 42 of the hook 16 when the hook arm 38 is in its fully hooked or clamped position. This will allow for the clamp 10 to operate in the manufacturing environment in a much more durable manner thus increasing the longevity and decreasing any down time of the manufacturing line due to replacement and cleaning of the clamp 10. It should also be noted that the pin 12 is removable, lighter in weight, smaller in size and will reduce down time on the manufacturing lines. The pin 12 is generally made of a hardened steel but any other metal material, hard ceramic, plastic, composite, etc., may also be used depending on the design requirements and strength needed for the manufacturing job of the variable thickness pin clamp 10. It should also be noted that the variable thickness pin clamp 10 will be capable of being used at different forces with different holding forces being achieved by using different sized and torqued springs between the torque arms 52, 58 of the variable thickness pin clamp 10. The hook arm 38 will come in contact with the work piece or device being hooked which will stop movement of the hook 16 and hence second torque arm 58 wherein the first torque arm 52 will continue its movement with relation to the second torque arm 58 by further movement of the first and second link members 64, 66. This movement of the first link arm 64 with relation to the second torque arm 58 which is fixed due to the hook arm 38 engaging the work piece will then compress the springs 80 arranged between the first and second torque arm 52, 58 and create a controlled force by the springs 80 between the flanges 54, 60 which will create a high holding force at the hook arm 38. Once the clamp 10 is toggled the springs 80 will create a force that will hold the hook arm 38 in its fully hooked position until the cylinder 74 releases the piston rod 72 and disengages the springs 80 from their tensioned position. It should be noted that the torque arms may also be used in a wedge lock clamping mechanism. The force between the first and second torque arm 52, 58 will hold the hook 46 in its clamped position without fear of unhooking or dislodging of the work piece from the hook arm 38. The ability to change and use different thickness and compression springs 80 will allow for a variety of holding forces to be applied in one clamp by changing out the spring components. It will also allow for the hook pin clamp 10 to be used on variable thickness work pieces without having to create a new clamp or spacer for each individual thickness. The thickness will range anywhere between a few millimeters up to five cm difference in thickness of the pieces being held. This will all depend on the design requirement and size of the springs 80 being used between the torque arms 52, 58 within the clamp body 18.

Other contemplated embodiments may also be designed and shown from the above mentioned discussion and the attached drawings to include any known designs in the art for such pin assemblies to create a variable thickness hook pin clamp that is capable of being used on variable thickness parts and capable of being used to create the variable holding forces for the hook pin clamps.

While it may be apparent that the preferred embodiments of the invention disclosed are well calculated to fill benefits, objects, or advantages of the invention, it will be appreciated that the invention is susceptible to modifications, variations and change without departing from the proper scope of the invention as shown.

The invention claimed is:

1. A pin clamp, said clamp comprising:

a body;

a pin arranged on one end of said body;

a hook arranged within said pin;

a first torque arm with two ends having a flange extending from each end of said first torque arm connected to said hook;

a second torque arm with two ends having a flange extending from each end of said second torque arm, said second torque arm flanges opposing said first torque arm flanges;

a first and second spring, each spring positioned between a respective pair of opposed flanges of said first and second torque arms for biasing said first and second torque arms with respect to one another for enabling relative movement of said first and second torque arms with respect to one another; and;

a link member connected to said second torque arm.

2. The clamp of claim 1 further comprising a second link member connected to said link member.

3. The clamp of claim 2 further comprising a rod connected to said second link member.

4. The clamp of claim 2 further comprising a cylinder connected to an end of said body.

5. The clamp of claim 4 wherein said cylinder having a piston and said rod slidingly arranged therein.

6. The clamp of claim 1 further comprising a pin base secured to said body.

7. The clamp of claim 1 wherein said hook contacts and holds workpieces having different thicknesses.

8. The clamp of claim 1 wherein said springs may be changed to create different holding forces for the clamp.

9. The clamp of claim 1 further comprising an electronic sensor connected to said body.

10. The clamp of claim 1 further comprising a fastener arranged between said torque arms, said fastener arranged within said spring.

11. A variable thickness pin clamp for use in a manufacturing environment, said clamp comprising:

a body;

a cylinder connected to one end of said body;

a pin base connected to another end of said body;

a pin arranged within said pin base;

a hook arranged within said pin and said body;

a first torque arm with two ends having a flange extending from each end of said first torque arm connected to said hook;

a second torque arm with two ends having a flange extending from each end of said second torque arm, said second torque arm flanges opposing said first torque arm flanges;

a first and second spring, each spring positioned between a respective pair of opposed flanges of said first and second torque arms for biasing said first and second torque arms with respect to one another for enabling relative movement of said first and second torque arms with respect to one another; and a first link connected to said second torque arm;

a second link pivotally connected to said first link; and a rod partially arranged in said cylinder and said body wherein said rod is connected with said second link.

12. The clamp of claim 11 further comprising an electronic sensor arranged on said body.

13. The clamp of claim 11 further comprising a spacer arranged around said pin.

14. The clamp of claim 11 further comprising a fastener arranged between said first torque arm and said second torque arm.

15. A variable thickness pin clamp for use in a manufacturing environment, said clamp comprising:

a body;

a cylinder connected to one end of said body;

a pin base connected to another end of said body;

a pin arranged within said pin base;

a hook arranged within said pin and said body;

a first torque arm with two ends having a flange extending from each end of said first torque arm connected to said hook;

a second torque arm with two ends having a flange extending from each end of said second torque arm, said second torque arm flanges opposing said first torque arm flanges;

at least one spring positioned between respective pairs of said opposed flanges of said first and second torque arms for biasing said first and second torque arms with respect to one another for enabling relative movement of said first and second torque arms with respect to one another; and a first link connected to said second torque arm;

a second link pivotally connected to said first link; and a rod partially arranged in said cylinder and said body wherein said rod is connected with said second link.

* * * * *